United States Patent [19]

Thompson et al.

[11] Patent Number: 4,522,464
[45] Date of Patent: Jun. 11, 1985

[54] ARMORED CABLE CONTAINING A HERMETICALLY SEALED TUBE INCORPORATING AN OPTICAL FIBER

[75] Inventors: Robert E. Thompson, Ronoake; Gordon Gould, Great Falls, both of Va.; Charles I. Soodak, Silver Spring, Md.

[73] Assignee: Chevron Research Company, San Francisco, Calif.

[21] Appl. No.: 408,972

[22] Filed: Aug. 17, 1982

[51] Int. Cl.³ ............................................. G02B 5/14
[52] U.S. Cl. ................................................. 350/96.23
[58] Field of Search ................................. 350/96.23

[56] References Cited

U.S. PATENT DOCUMENTS

| | | | |
|---|---|---|---|
| 2,706,376 | 5/1954 | Kerr | 57/6 |
| 3,883,218 | 5/1975 | Slaughter | 350/96 B |
| 3,955,878 | 5/1976 | Nowak | 350/96 R |
| 4,039,248 | 8/1977 | Franke et al. | 350/96 B |
| 4,078,853 | 3/1978 | Kempf et al. | 350/96.23 |
| 4,093,342 | 6/1978 | Foord et al. | 350/96.23 |
| 4,113,349 | 9/1978 | Stiles | 350/96.23 |
| 4,117,300 | 9/1978 | Richards | 219/121 LM |
| 4,156,104 | 5/1979 | Mondello | 174/70 R |
| 4,158,478 | 6/1979 | Areia et al. | 350/96.23 |
| 4,162,400 | 7/1979 | Pitts | 250/256 |
| 4,166,670 | 9/1979 | Ramsay | 350/96.23 |
| 4,189,705 | 2/1980 | Pitts | 250/262 |
| 4,239,335 | 9/1980 | Stiles | 350/96.23 |
| 4,239,336 | 12/1980 | Parfree et al. | 350/96.23 |
| 4,359,598 | 11/1982 | Dey et al. | 350/96.23 |
| 4,367,917 | 1/1983 | Gray | 350/96.23 |
| 4,389,645 | 6/1983 | Wharton | 340/854 |

FOREIGN PATENT DOCUMENTS

| | | |
|---|---|---|
| 2836314 | 8/1978 | Fed. Rep. of Germany . |
| 2920428 | 5/1979 | Fed. Rep. of Germany . |
| 1073958 | 5/1967 | United Kingdom . |
| 1438074 | 6/1976 | United Kingdom . |
| 2029048 | 3/1980 | United Kingdom . |
| 1598540 | 9/1981 | United Kingdom . |
| 2084757 | 4/1982 | United Kingdom . |
| 2085187 | 4/1982 | United Kingdom . |
| 2104752 | 3/1983 | United Kingdom . |
| 2088584 | 6/1984 | United Kingdom . |

OTHER PUBLICATIONS

Copperwald Bimetallics Group, Pub. No. 183-6-81.
Fiber Optic Data Transmission System for Borehole Logging Final Report, Aug. 14, 1981, DOE Contract 78-241-S.
Evaluation of Optical Fiber Cable for Transmission Subsurface Drill Hole Logging Data/Report on Phase 1-B, Dec. 19, 1979 (DOE 78-241-S).
Patent Abstracts of Japan, vol. 5, No. 202, Dec. 22, 1981.
Applied Optics, vol. 21, No. 5, Mar. 1, 1982, N. Kojima et al.
Armored Optical Cable Brochure/Optelecom, Oct. 1980.

*Primary Examiner*—William L. Sikes
*Assistant Examiner*—Robert E. Wise
*Attorney, Agent, or Firm*—S. R. LaPaglia; E. J. Keeling; A. Stephen Zavell

[57] ABSTRACT

An armored cable containing a hermetically sealed tube incorporating an optical fiber is described. The armored optical cable exhibits minimal inelastic elongation in response to tension at elevated temperatures and is capable of withstanding harsh ambient conditions.

44 Claims, 1 Drawing Figure

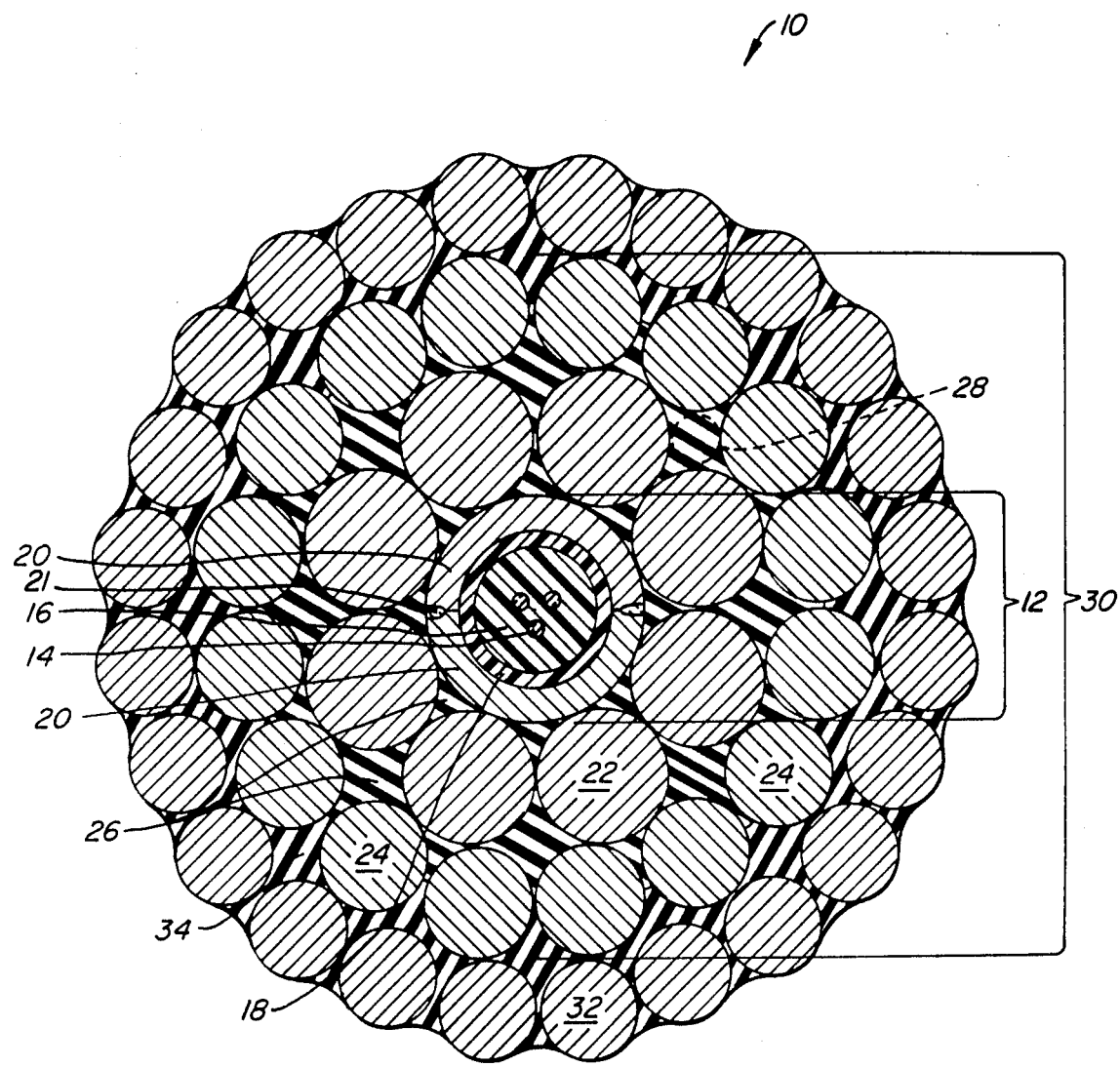

ARMORED CABLE CONTAINING A HERMETICALLY SEALED TUBE INCORPORATING AN OPTICAL FIBER

This invention relates to armored cables. More specifically, this invention relates to armored optical fiber cables.

BACKGROUND OF THE INVENTION

Conventional electromechanical cables for applications such as oil well logging include insulated metal conductors for the transmission of electrical signals. Such cables have signal transmission bandwidths that are limited to about 100 KHz over lengths that correspond to typical depths of oil wells, 12,000 to 20,000 feet. Much of the information that is obtainable from modern logging tools is not retrievable from down the well bore due to the restricted signal bandwidth that is characteristic of state-of-the-art conventional logging cables. Consequently, a need exists to provide cables that have substantially higher signal transmission bandwidths, i.e., capacity, and/or greater transmission rates through long cable lengths without repeaters. Optical fibers can provide signal transmission bandwidths of about 100 MHz through lengths up to about 30,000 feet. This is about three orders of magnitude higher than the insulated wires that are used in conventional cables for applications in harsh environments such as well logging.

Glass optical fibers have two properties which make it difficult to successfully incorporate them into strain cables which will be stretched when used or which will be used under water, particularly at high pressure and/or high temperature such as are found in an oil well drill hole. These properties are static fatigue degradation and microbending loss.

Silica glass fibers have small cracks (microcracks) on their surface. The depth of these microcracks can increase through a stress-accelerated chemical reaction between the silica glass and moisture, called static fatigue. The tensile strength of the glass fiber decreases substantially as the microcracks increase in depth. Glass is an elastic material with a high Young's modulus. Strain in a glass optical fiber generates tensile stress and results in static fatigue. Thus, glass optical fibers are not suitable for use under high strain (>0.5%) in the presence of moisture over extended periods of time. No plastic can provide adequate protection since water diffuses through all plastics to some degree.

Loss of light through small bends in the fiber (microbending losses) is described hereinafter. Optical fibers transmit light signals by the principle of total internal reflection. This principal depends upon the light rays being totally reflected back into the core region each time they impinge upon the core to cladding interface of the optical fiber. Total internal reflection can only occur when the angle of incidence between the rays and the core to cladding interface is below a certain critical value. Bending of an optical fiber causes some of the light which is propagating in the fiber core to impinge upon the core to cladding interface at angles of incidence greater than the critical value and to be refracted out of the optical core and lost. The amount of the light that is lost becomes greater as the effective diameter of the bend becomes smaller. When the bending of the optical fiber is caused by deflection due to local lateral forces, the resulting decrease in signal strength (and decrease in the length of the cable which can be used) is called microbending loss. When an optical fiber is deflected by a local inhomogeneity, such as a lump in its coating layers, the effective diameter of the bend depends upon the local strain the fiber is under. Generally, the fiber will bend to a smaller effective diameter as the strain level it is under increases. Consequently, higher strain levels result in higher levels of microbending loss. Microbending losses in fibers are greatly reduced by first coating the fibers with a soft elastomer such as silicone rubber, and encasing this buffered fiber in a rigid jacket which can withstand external forces. However, plastics such as silicone rubber lose their integrity under conditions encountered in harsh environments such as at the bottom of a deep well, i.e., when subjected to hot brine at pressures up to 20,000 psi and temperatures up to 500° F.

Thus, it would be desirable to have a hermetically sealed tube, containing at least one optical fiber, which can be incorporated into a well logging cable. The tube would minimize the microbending of the fiber and moisture-induced microcrack failure in the fiber.

A necessary condition for accurate logging of a well bore is an accurate knowledge of the position of the logging tool within the well bore. The position of the tool is defined by the actual length of logging cable that is suspended in the well bore. The actual length of suspended cable can be determined from a knowledge of the amount of unstressed cable length that has been lowered into the well plus a knowledge of the elongation versus tension characteristics of the cable and the tension along the suspended cable length. The amount of unstressed cable length that has been lowered into the well bore can be precisely measured. The tension profile along the suspended length of cable can be accurately calculated. Therefore, the actual length of cable suspended in the well can be accurately determined if the elongation versus tension characteristics of the cable are accurately known and are repeatable.

Conventional electromechanical cables for well logging can be constructed to withstand harsh high temperature environments and to accept high levels of axial strain while still remaining functional. More specifically, for example, each conductor element in a conventional logging cable comprises a bundle of copper wires. The copper wires yield inelastically at low strain. When the cable is alternately stretched and relaxed, the copper does not fully return to its original state and eventually the copper wires become brittle, due to strain hardening, and break. However, even this serious condition does not necessarily render the cable inoperable because a break in one or more wires with adjacent non-broken wires permits the current to be passed to the neighboring wires and thus the conductor still appears whole and the cable remains functional. Thus, conventional logging cables can withstand considerable inelastic and elastic strain and still remain functional.

Well logging cables are generally constructed with two layers of external steel armor wires. The armor wires are preformed and applied in helices of opposing handedness to prevent the cable from unwinding when supporting a free hanging load. Inside the armored jacket can be seven insulated copper conductors laid six around one in helices generally of opposite handedness to those of the steel wires in the inner armor layer. However, there is no definite relationship between the helices of the copper conductors and those of the inner armor wires since they are added in separate fabrication steps and usually with a bedding layer of a pliant material therebetween. A result of this conventional cabling geometry is that the interface between the inner armor wires and the underlying insulated conductors consists of a multiplicity of cross-over points separated by the pliant bedding material.

When a conventional well logging cable is tensioned at elevated temperatures, it will elongate by an amount which is not acurately predictable. This is because the elongation consists of two parts, one that is linear and one that is highly nonlinear and inelastic. The inelastic part occurs because the armor wires inelastically deform the underlying compliant bedding and the wire insulation, due to very high local stresses at the cross-over points, and take on a smaller pitch diameter. The inelastic part of the cable elongation is not very predictable or repeatable and consequently the position of the logging probe will not be accurately known.

In order to prevent inelastic strain from occurring in use, conventional logging cables are given a hot prestretch during fabrication. When properly conducted, the hot prestretch operation will result in a cable that exhibits a linear and elastic elongation in response to tension. The hot prestretching operation imparts a permanent (inelastic) strain of between ¾ to 1½ percent to conventional seven-conductor logging cables. Hot prestretching of a conventionally designed armored cable containing one or more optical fibers within its core would leave the glass optical fibers under a permanent elongation of ¾ to 1½ percent. Optical fibers in cables subjected to these high permanent strain levels would soon fail from static fatigue and/or exhibit intolerably high microbending losses. It is apparent that conventional prestretching technology cannot be applied to armored optical fiber cables. Thus, it would be highly desirable to have an armored fiber optic cable which overcomes these and other difficulties and permits the expansion of optical fiber communications technology into areas of harsh environments.

SUMMARY OF THE INVENTION

We have invented a cable and method of fabrication which minimizes the inelastic part of the cable elongation by minimizing the deformability of the core. The central bundle of the cable comprises at least two inner layers, including the inner armor, which are stranded in a "unilay" configuration of a given handedness around a central hermetically sealed tube which contains at least one buffered fiber. A buffered optical fiber is an optical fiber coated with a suitable cushioning material such as an elastomer. The tube is fabricated so that the fibers are hermetically sealed therein with a minimum of process-induced strain and microbends.

A "unilay" configuration is defined as a cable bundle wherein each element is in continuous contact with, and in the same orientation with respect to its nearest neighbors. The cross-sections of the central bundle are identical at every point along the cable, except for a rotation about the central axis. The unilay construction distributes the transverse forces continuously along the touching components instead of concentrating the forces at crossover points as in contrahelically formed layers of cable elements or layers of unidirectionally cabled elements that have different lay lengths. The lay length of the cable is long, on the order of about 3.5 inches for a cable with an outside diameter of about 0.5 inch. The lay length should be increased in direct proportion as the diameter of the cable increases. "Lay length" is defined as the distance along the cable or helical axis traversed by one complete helical revolution of the element. The cable has at least one outer armor layer which is contrahelically wound around the central bundle. The outer armor layer is of opposite handedness to the central bundle and substantially balances the torque of the inner armor when the cable is under tension. The elements of the layers are hard and resistant to deformation. This means that any conductor elements contained in the cable are single metal conductors and not multifilament conductors.

The layers in the central bundle are fabricated in a single operation with the same lay length and with the same handedness. The outer armored layer of opposite handedness is applied directly over the central bundle.

BRIEF DESCRIPTION OF THE DRAWING

FIG. 1 illustrates a cross-sectional view of an armored optical fiber cable.

DETAILED DESCRIPTION OF THE INVENTION

The invention will be more clearly illustrated by referring to FIG. 1. FIG. 1 illustrates an armored optical cable 10 of our invention. The armored optical cable 10 will be described with respect to specific embodiments such as overall size, dimensions and materials used to fabricate a well logging cable which comes within the scope of the invention. However, the invention is not intended to be limited solely to the specific dimensions or materials used in the description nor to only well-logging applications. The described cable is useful in any application which requires minimum cable deformations under load.

The armored optical cable 10 has a central hermetically sealed tube core 12. The hermetically sealed tube 12 has an outer diameter of about 0.120 inches ±1%, within an inside diameter of about 0.06 inches. The tube 20 includes one or a plurality of optical fiber(s) 14. The optical fibers 14 can be single-mode or multimode fibers, or mixtures thereof. Suitable optical fibers with a thin protective coating of a U.V. cured acrylic based plastic are manufactured by Valtec Co. in Massachusetts. If the hermetically sealed tube 12 includes a plurality of optical fibers, the optical fibers should preferably be stranded together with the same helical handedness as the elements 22 and the inner armor wires 24 of the central bundle 30. For example, the three fibers illustrated have a right-handed lay sense and about a 3.5 inch lay length (1.2° lay angle).

The coated fibers are surrounded by and coated with a cushioning material 16 such as an elastomeric cushioning material, for example silicone elastomers and the like. Additional elastomer or other suitable flood material 18 is added to partially or as illustrated completely fill the tube 12 during the fabrication of the complete tube 12.

The tube 12 is fabricated from hemicylindrical sections 20 which are preshaped by rolling or drawing from an annealed wire. Although two sections 20 are illustrated, the tube 10 can be formed from any number of sections. The rolling or drawing of the cylindrical sections work hardens the metal before the fiber is enclosed therein. The cylindrical sections are made from steel or other alloy wire which can optionally be precipitation hardened to yield a high yield strength by heat treatment before welding. Precipitation hardening is defined as a process of hardening in which a constituent precipitates from a supersaturated solid solution. Thus the work hardened metal may be further enhanced in yield strength by precipitation hardening. Suitable standard rolling machines and processes such as those used by the Shaped Wire Co. of Illinois, can be used to squeeze wire into the hemicylindrical sections 20 which form the tube 12. Suitable examples of stainless steel wire or other suitable material are 17-7 PH stainless steel, a product of Armco, MP-35 nonferrous alloy, a product of Latrobe Steel Co., Latrobe, Pa. The sections formed from the wires should have a yield stress greater than about 100,000 psi and preferably greater than about 150,000 psi. If greater yield stress is needed, these wire materials can be precipitation hardened to greater than about 250,000 psi yield stress. This corresponds to greater than about 0.85 yield strain. Yield strain is defined as the maximum strain that can be applied without substantial permanent deformation of the test specimen. This permits the tube to run over about a 36" and preferably a 24 inch diameter or less sheave or wound around a 36" and preferably a 24 inch diameter or less cable reel barrel under working load without yielding inelastically.

The sections 20 fit together longitudinally to form the tube 12. The longitudinal seams are subjected to only small secondary shear stress when the tube is bent over a sheave or spool. The sections 20 are pressed together and welded where the edges meet by welds 21 to hermetically seal the fibers 14 therein. During the fabrication of the tube, the stranded and buffered fibers are fed between the cylindrical sections as they come together with enough clearance to avoid pinching. The welding is preferably done with laser welding which makes a clean melt which can be confined to a small volume which does not penetrate all the way through the wall, and therefore does not anneal the whole wall thickness and does not destroy the buffered fibers. Optionally, for further protection, the completed tube can be coated with a hard plastic of a suitable material such as polyvinylidene difluoride (Kynar ®) or polyetheretherketone (PEEK ®), or galvanized.

An alternative tube structure is described in an application entitled "Hermetically Sealed Optical Fiber" by Gordon Gould, Robert Thompson, and Charles Soodak and filed concurrently herewith (assigned U.S. Ser. No. 408,971, filed Aug. 17, 1982), and completely incorporated herein by reference.

In the preferred embodiment, the space for the central hermetically sealed tube 12 is formed by at least six elements 22, such as conductor strands, layed around the central core 12 with a right-handed lay sense and a 3.5 inch lay length (9.8° lay angle). To obtain a larger diameter for the central core 12, more conductor strands, e.g., eight, as illustrated, are used to fabricate the space for the central core 12. The conductor strands 22 should be fabricated from material which minimizes deformation and is capable of interlocking with the inner armor 24. Suitable conductor strands are solid copper-plated steel wire having a diameter of about 0.0403±1%. The conductor strands should have a minimum conductivity of 60% minimum of International Annealed Cooper Standard (IACS) with a yield strain of about 0.9% minimum at 0.2% offset. A material meeting these requirements is Copperweld ®. The solid copper-plated steel wire is coated with an insulator such as Kynar ® to an outer diameter of about 0.071 inches. The hermetically sealed tube 12 and the conductor strands 22 should have a combined outer diameter of about 0.262 inches.

At least twice the number of inner armor wires 24 surround the conductor strands 22. In this preferred embodiment, sixteen inner armor wires 24 should be of a drawn, galvanized, improved plow steel rope wires (AISI) or other suitable material with a diameter of about 0.0575 inches ±1%, minimum tensile strength of about 244 KPSI minimum torsions (8") of about 39, a coating adherence as evidenced by a 3D mandrel wrap test. The inner armor wires 24 are layed as part of the central bundle 30 with a right-handed lay sense and a 3.5 inch lay length (15.5° lay angle). The central bundle 30 has an outside diameter of about 0.368 inches. It is important that the sixteen inner armor wires 24 be electro-galvanized with bright and smooth finishes such as a minimum zinc coating of about 0.2 oz./ft.$^2$. The inner armor wires 24 lie adjacent to the insulated conductors and hence must provide a smooth interface for transferring compressive loads to the insulated wires.

A suitable protective material 26 for the intended environment of the cable 10 is applied during the fabrication of the central bundle 30 out to the inner armor 24. Suitable materials for a well logging cable are nitrile rubber based filling compounds and the like. The inner armor wires 24 are wound around the conductor strands 22 as illustrated to provide room for eight intersticial elements 28. The eight intersticial elements 28 are optional and can be either a corrosion inhibitor lubricant 26, such as TMS 5878 Compound, a product of Quaker Chemical Company, or wires or insulated conductors or jacketed optical fibers. The intersticial elements 28 are layed with the same lay sense as conductor strands 22 and inner armor wires 24. The intersticial elements 28 are cabled with a right-handed lay sense and a 3.5 inch lay length (12.5° lay angle). The intersticial elements 28 must have a maximum outside diameter of about 0.028 inches minimum zinc coating of about 0.1 oz./ft$^2$, minimum tensile strength of about 251 KPSI, minimum torsions (8"). of about 83, and a coating adherence as evidenced by 2D mandrel wrap test. If the intersticial elements 28 are used to control the placement of the inner armor wires 24, then the elements 28 should preferably be solid, bright, galvanized wires. It is important that any intersticial elements 28 have a rounded and smooth external surface since they lie adjacent to the insulated conductor strands and must provide a smooth surface for transferring compressive loads to the insulated strands.

A unique feature of the armored optical cable 10 is the fact that the elements of the central bundle 30 are fabricated with the same lay length and handedness so that they nestle together and do not crossover each other. Another unique feature is the fact that the conductor strands 22 and the inner armor wires 24 are assembled in the same operation so that the elements 22 and 24 rest on each other and not in the grooves formed between the conductor strands 22. This construction gives the cable greater flexibility and reduces friction between the conductor strands 22 and the inner armor wires 24. These features provide for minimal deformation of the interface between the elements and hence minimal inelastic elongation of the cable.

Surrounding the inner armor wires 24 and forming the outside diameter of the cable 10 is at least one layer of outer armor wires. Illustrated in the preferred embodiment are twenty-four strands of outer armor wires 32. The outer armor wires 32 should be fabricated from galvanized, improved plow steel rope wires (AISI) or other suitable materials having about a 0.049 diameter ±1%, minimum zinc coating of about 0.4 oz./ft.$^2$, test per ASTM A-90, minimum tensile strength of about 246 KPSI, test per ASTM E-8, minimum torsions (8") of about 47, test per FED SPEC RR-W-410, and an adherence coating meeting ASTM A-641 using a 3D mandrel. The wires 32 are preferably preformed and layed with a lay sense opposite that of elements 22 and 24. The outer armor must be wound in opposite handedness to the inner armor and of sufficient compressive strength such that the inner armor and the outer armor are substantially torque balanced. For this example, the lay handedness of the outer armor wires 32 should be a left-handed lay sense and a 3.5 inch lay length (20.5° lay angle). As the outer armor wires 32 are being applied, the central bundle 30 is coated with a corrosion-resistant and lubricating material 34 such as TMS5878, and the like. The overall dimensions of the optical cable 10 will be about 0.469 inches.

The armored cable containing the hermetically sealed tube is fabricated by first forming the tube in one operation and thereafter fabricating the cable around the tube in one in-line operation.

The hermetically sealed tube containing the optical fibers can be fabricated according the following procedure. Annealed stainless steel or other suitable nonferrous alloy wires are rolled by shaped rollers into cylindrical sections such that upon passing through guide rollers the sections form a tube having a sufficient internal diameter to contain the optical fibers without pinching tne fibers. The rolled sections are then precipitation hardened at a temperature of about 900° F. Preferably, the tube is formed of only two hemicylindrical sections because this minimizes the number of welds. Suitable rolled sections are obtained from The Shaped Wire Co., St. Charles, Ill. Cylindrical sections can be pressed together by standard pressing rollers such as used by Laser Applications Inc., Baltimore, Md. prior to and during the laser welding. The helically wound coated fibers are inserted between the sections as they are squeezed together and additional elastomeric material is added to adhere the fibers thereto prior to welding.

The laser welding is performed with a 500 watt industrial $CO_2$ laser of Control Laser Corp. The laser is focused to a width of about 0.15 mm. The tube is welded to a depth which is less than the thickness of the sections. A depth of about 0.40 mm is suitable in the fabrication of an outside tube having a diameter of about 0.110–0.120 inches. Optionally, the cylindrical sectors may be heated to between 300° F. and about 500° F. during welding. The heating facilitates the welding process and also results in up to about 0.2% contraction of the tube when it cools. This obviates up to about 0.2% stretch of the fiber due to thermal expansion when the cable is lowered in a drill hole experiencing temperatures on the order of up to about 500° F.

The welding process leaves the seams in a strained condition, a heat treatment at about 500° F. for a few hours after welding relieves such strains without annealing the precipitation hardened tube. Precipitation hardening the tube is not possible once the optical fiber is enclosed therein because this overheats and destroys the buffering polymers. After welding, the tube can optionally be nickel plated or galvanized to resist corrosion and finally the tube may optionally be covered with an extrusion of a high melting point plastic such as PEEK ® or Kynar ® to minimize the diffusion of brine into any pin holes left after welding and also to protect the metal from corrosion. Suitable extrusions are made by the Berk Tek Co. of Pennsylvania.

After the fabrication of the tube 12, the central bundle 30 is formed from one bay of planetary bobbins and the outer armor wires 32 are applied directly over the central bundle 30 from a tandem bay of planetary bobbins. The outer armor wires 32 are applied in an opposite handedness such that the torques exerted by said inner and outer armor wires are substantially balanced. A suitable method of balancing the contrahelically wound outer armor wires 32 and the inner armor wires 24 is disclosed in U.S. Pat. No. 4,317,000, completely incorporated herein by reference. The machines which fabricate the cable of our invention are known in the art as planetary cabling machines. A suitable source for the fabrication of the cable is Blake Wire and Cable Company of Torrence, Calif. Of course, the cable can also be fabricated by a tube winder cabling machine; however, the outer armor wires will have to be applied in a separate step.

Having described our invention with respect to a particularly preferred embodiment and some preferred alternatives, it should be understood that the invention is not intended to be limited solely to the description therein. Modifications which would be obvious are intended to be within the scope of the invention. For example, the cable is not limited to any specific diameter, number of optical fibers, and the like. A different environment or job application which required a larger load placed on the cable could require a larger diameter cable with larger and/or more conductor strands, inner armor wires or outer armor wires.

What is claimed is:

1. An armored optical cable suitable for use in an environment which subjects said cable to repeated longitudinal elongation and relaxation forces, said cable comprising:
   a central hermetically sealed tube core, said core comprising at least two metal sections fitting together around one or a plurality of buffered optical fibers and forming a cylindrical tube, said metal sections hermetically joined into said tube, wherein said metal sections were preshaped by rolling from an anealed wire, and wherein said metal sections and the tube formed therefrom are fabricated from metals which exhibit a yield strain greater than about 0.85;
   at least six substantially solid elements wound helically around said core in a given handedness;
   at least twice the number of said at least six elements of inner armor wires wound around and contacting said at least six elements of the same handedness in a unilay helical configuration, said at least six elements and said inner armor wires being fabricated around said core at the same time wherein the elements and the wires of the same handedness and the core form a central bundle; and
   a plurality of outer armor wires contacting said inner armor wires, said out armor wires wound in an opposite helical handedness to the handedness of said inner armor wires such that the torques exerted by said inner armor wires and said outer armor wires substantially balanced.

2. The cable according to claim 1 wherein said core comprises three helically wound optical fibers embedded in a cushioning material within said core.

3. The cable according to claim 2 wherein said sections of said core undergo precipitation hardening after being rolled into cylindrical sections and prior to being joined by laser welding.

4. The cable according to claim 3 wherein said sections are fabricated from stainless steel wires or nonferrous alloy wires.

5. The cable according to claims 1 or 4 wherein said at least six elements are insulated solid conductor strands of a copper-plated steel wire conductors.

6. The cable according to claim 5 wherein the inner armor wire is galvanized steel wire.

7. The cable according to claim 6 wherein the conductor strands and the inner armor wires from substantially uniform in size intersticial spaces there between, said intersticial spaces are occupied by jacketed optical fibers, insulated conductors, a corrosion inhibitor lubricant, or galvanized steel wire fillers.

8. The cable according to claim 7 wherein the central core element conductor strands inner armor wires are coated with a nitrile rubber-based filling compound.

9. The fiber according to claim 7 wherein the outer armor wires are galvanized, preformed, plough steel wires and the central core element, the conductors, the inner and outer armor wires are substantially round.

10. the cable according to claim 9 wherein the central core conductor strands inner armor wires are coated with a nitrile rubber-based filling compound.

11. The cable according to claim 9 wherein the sections are joined along longitudinal seams and said at least six elements are eight elements.

12. The cable according to claim 11 wherein the central core element, the conductor strands and inner armor wires are coated with a nitrile rubber-based filling compound and said conductor strands are insulated.

13. The cable according to claim 12 wherein said tube has a yield stress greater than about 100,000 psi.

14. The cable according to claim 1 wherein the central core, conductor strands and inner armor wires are coated with a nitrile rubber based filling compound.

15. An armored optical well logging cable comprising:
a central substantially round hermetically sealed tube core having an outer diameter of between about 0.110 to about 0.120 inches, and an inner diameter of about 0.06 inches, said core including therein a plurality of optical fibers embedded in an elastomer, said core formed from two metal sections joined longitudinally together around said fibers and forming a cylindrical tube, said tube exhibiting a yield strain greater than about 0.85;
eight substantially round and insulated solid conductor strands wound around said central core with a right hand lay and about a 3.5 inch lay length and a diameter of 0.071 inches such that the outer diameter of the central core and the conductor strands is about 0.262 inches;
sixteen substantially round inner armor strands of galvanized steel wire having an outer diameter of about 0.058 inches wound around and contacting said conductor strands in the same handedness and lay length as said conductor strands, said conductor strands and said inner armor being fabricating in the same operation, wherein said central core, said conductor strands and said inner armor wires from a central bundle having an outer diameter of about 0.368 inches; and
twenty-four substantially round outer strands of galvanized steel wire wound around and contacting said sixteen inner strands in a let hand lay with a 3.5 inch lay length, said twenty-four strands having a diameter of about 0.049 inches such that the total cable diameter has an outside diameter of about 0.469 inches.

16. The cable according to claim 15 wherein the central bundle is filled with an elastomeric filling compound.

17. The cable according to claim 16 wherein the interstics formed between said inner armor strands and outer armor strands are filled with a corrosion inhibitor and lubricant.

18. The cable according to claim 17 wherein the eight interstices formed between said inner armor strands and said conductor strands are occupied by eight substantially round wire filler elements, said wire filler elements having a maximum diameter of about 0.028 inches.

19. The cable according to claim 18 wherein said tube has a yield stress greater than about 100,000 psi.

20. The cable according to claim 17 wherein said core is further coated with a corrosion resistant metal layer or high temperature plastic to an outer diameter of about $0.120 \pm 0.002$ inches.

21. The cable according to claim 20 wherein said core containing the fibers is heated to between about 300° F. to about 500° F. during the joining of the sections by laser welding.

22. A process of forming an armored optical fiber cable comprising:
rolling at least two annealed metal wires into sections, said sections capable of fitting together to form a cylindrical tube central core having an inner diameter sufficient to accept at least one or a plurality of buffered optical fibers;
forming said central core around said buffered optical fibers from the rolled sections;
joining hermetically said sections into said tube central core;
winding conductor elements helically around said tube central core, said winding is of a given handedness and lay length;
winding a layer of inner armor wires of the same handedness as said conductor elements and with the same lay length and applied at the same time as said conductor elements helically around said conductor elements; and
fabricating a layer of outer armor wires of opposite handedness to said layer of inner armor wires and with such a lay length that the torques extended by said inner and outer armor are substantially balanced when the cable is under tension.

23. The process according to claim 22 wherein the fabrication further comprises laying down cable elements in the intersticial space formed between said conductor elements and said layer of inner armor wires at the same time as said conductor elements and said layer of inner armor wires are being formed.

24. A process according to claim 22 wherein the joining is performed by laser welding.

25. A process according to claim 24 wherein said sections undergo precipitation hardening prior to welding to increase the yield strength of the finished sections.

26. A process according to claim 25 further comprising injecting an elastomer into a section and onto said buffered fibers prior to forming the said tube.

27. A process according to claim 26 further comprising forming a high temperature resistant plastic coating around said tube central core prior to winding said conductor elements around said tube central core.

28. In a method of well logging to obtain data about earth formations surrounding a wellbore wherein one end of an optical fiber cable is connected to a surface transmitter/receiver and the end opposite thereto is connected to an instrument for measuring and transmitting data about the earth formations through said optical fiber cable to the transmitter/receiver during the lowering and raising of the instrument in the wellbore, the improvement comprising:
    transmitting said data through an armored optical fiber cable which comprises; a central hermetically sealed tube core including one or a plurality of buffered optical fibers, said core formed from at least two metal sections joined hermetically together around said inner core and forming a cylindrical tube, sections hermetically wherein said metal sections were preshaped by rolling from an annealed wire, and wherein said tube exhibits a yield strain of greater than 0.85; at least six substantially solid elements wound helically around said tube in a given handedness; at least twice the number of said at least six solid elements of inner armor wires wound around and contacting said at least six solid elements with the same handedness in a unilay helical configuration, said at least six solid elements and said inner armor wires being fabricated around said tube at the same time wherein the elements and the wires of the same handedness and the tube form a central bundle; and a plurality of outer armor wires contacting said inner armor wires, said outer armor wires wound in an opposite helical handedness to the handedness of said inner armor wires such that the torques exerted by said inner armor wires and said outer armor wires substantially balanced; and
    transmitting electrical power or signals through said at least six elements.

29. The process according to claim 28 wherein the data is transmitted through a plurality of helically wound optical fibers embedded in a cushioning material within said tube and said electrical power or signals are transmitted through insulated copper-plated steel wires conductors forming said at least six elements.

30. The process according to claim 29 wherein the data is transmitted through the optical fibers of said armored optical fiber cable which further incorporates wire control elements located in the interstices between said inner armor wires and said at least six elements.

31. An armored optical fiber cable suitable for use in an environment which subjects said cable to repeated longitudinal elongation and relaxation forces, said cable comprising:
    a central hermetically sealed tube core, said core comprising at least two metal sections fitting together around one or a plurality of buffered optical fibers and forming said core, wherein said metal sections were preshaped by rolling from an aneated wire, and wherein said metal sections and the tube formed therefrom are fabricated from metals which exhibit a yield strain greater than about 0.85;
    a plurality of insulated conductor elements wound helically around said central core in a given handedness and lay length;
    a plurality of inner armor wires wound around and substantially continuously contacting adjacent insulated conductor elements, said inner armor wires having the same handedness and lay length as said insulated conductor elements; and
    a plurality of torque balancing outer armor wires wound around said outer armor wires in an opposite helical handedness to the handedness of said inner armor wires.

32. The armored optical fiber cable of claim 31 further characterized in that said insulated conductor elements are substantially solid and include a layer of electrically conductive material attached to a body of different material having a yield strength under tension substantially higher than that of said electrically conductive material.

33. The armored optical fiber cable of claim 32 further characterized that the inner armor wires are smooth so as to provide a smooth interface for transferring compressive loads to said insulated conductor elements.

34. The armored optical fiber cable of claim 33 where said inner armor wires are electro-galvanized steel wires.

35. The armored optical fiber cable of claim 34 where said conductor elements and said inner armor wires form substantially uniform in size interstitial spaces therebetween, said interstitial spaces are occupied by jacketed optical fibers, insulated conductors, a corrosion inhibitor lubricant, or galvanized steel wire fillers.

36. An armored optical fiber cable suitable for use in well logging which subjects said cable to repeated longitudinal elongation and relaxation forces, said cable comprising:
    a central hermetically sealed tube core, said core comprising at least two metal sections fitting together around one buffered optical fiber of a plurality of helically wound buffered optical fibers and forming said core, wherein said metal sections were preshaped by rolling from an aneated wire, and wherein said metal sections and the tube formed therefrom are fabricated from metals which exhibits a yield strain greater than about 0.85;
    plurality of substantially solid insulated conductor elements wound helically around said central core in a given handedness and lay length, said solid insulated conductor elements being disposed in and substantially filling a first annular ring at any given cross-section along the length of said cable;
    a plurality of inner armor wires wound around said insulated conductor elements, said inner armor wires having the same handedness and lay length as said insulated conductor elements, said inner armor wires being disposed in and substantially filling a second annular ring concentric with said first annular ring at any cross-section along the length of said cable, each of said inner armor wires resting on an adjacent insulated conductor element and not in the grooves formed between adjacent insulated conductor elements to provide said cable with flexibility and to reduce friction between said insulated conductor elements and said inner armor wires, said central core, said insulated conductor elements and said inner armor wires forming a central bundle; and
    a plurality of torque balancing outer armor wires wound around said inner armor wires in an opposite helical handedness to the handedness of said inner armor wires, said outer armor wires being disposed in and substantially filling a third annular ring generally concentric with said second annular ring at any given cross-section along the length of said cable.

37. The armored optical fiber cable of claim 36 further characterized by the presence of at least six of said insulated conductor elements.

38. The armored optical fiber cable of claim 36 characterized by the presence of at least twelve of said inner armor wires.

39. The armored optical fiber cable of claim 38 characterized in that the said optical fiber is contained in said core.

40. The armored optical fiber cable of claim 36 further characterized by the presence of interstitial elements located in said grooves formed between adjacent ones of said insulated conductor elements to control the placement of the inner armor wires.

41. The armored optical fiber of claim 40 characterized in that said interstitial elements are occupied by jacketed optical fibers, insulated conductors, galvanized steel wire fillers or combinations thereof.

42. The armored optical fiber cable of claim 40 characterized in that said interstitial elements are smooth bright galvanized wires.

43. The armored optical fiber cable of claim 42 further characterized in that the inner armor wires are electro-galvanized steel wires.

44. The armored optical fiber cable of claim 40 further characterized in that said insulated conductor elements include a layer of electrically conductive material attached to a body of different material having a yield strength under tension substantially higher than that of said electrically conductive material.

* * * * *

UNITED STATES PATENT AND TRADEMARK OFFICE
CERTIFICATE OF CORRECTION

PATENT NO. : 4,522,464
DATED : June 11, 1985
INVENTOR(S) : ROBERT E. THOMPSON ET AL It is certified that error appears in the above-identified patent and that said Letters Patent are hereby corrected as shown below:

Claim 7, Col.9, Line 15, "intestical" should read --intersticial--

Claim 8, Col.9, Line 23, "The fiber" should read --The cable--

Claim 10, Col.9, Line 27, "the" should read --The--

Claim 17, Col. 10, Line 12, "interstics" should read --interstices--

Claim 29, Col.11, Line 43, "The process" should read --The method--

Claim 30, Col.11, Line 49, "The process" should read --The method--

Signed and Sealed this

Eleventh Day of March 1986

[SEAL]

Attest:

DONALD J. QUIGG

Attesting Officer

Commissioner of Patents and Trademarks